(12) United States Patent
Williamson

(10) Patent No.: US 9,580,355 B2
(45) Date of Patent: Feb. 28, 2017

(54) CONCRETE REINFORCEMENT SYSTEM

(71) Applicant: James Kelly Williamson, Tuscaloosa, AL (US)

(72) Inventor: James Kelly Williamson, Tuscaloosa, AL (US)

( * ) Notice: Subject to any disclaimer, the term of this patent is extended or adjusted under 35 U.S.C. 154(b) by 0 days.

(21) Appl. No.: 14/812,071

(22) Filed: Jul. 29, 2015

(65) Prior Publication Data

US 2017/0029329 A1 Feb. 2, 2017

(51) Int. Cl.
*C04B 14/38* (2006.01)
*C04B 14/02* (2006.01)
*C04B 28/00* (2006.01)

(52) U.S. Cl.
CPC ............ *C04B 14/026* (2013.01); *C04B 28/00* (2013.01)

(58) Field of Classification Search
CPC . C04B 14/026; C04B 14/386; C04B 20/0056; C04B 20/006; C04B 28/02
See application file for complete search history.

(56) References Cited

U.S. PATENT DOCUMENTS

| 4,176,705 A | 12/1979 | Russell et al. |
| 5,603,208 A | 2/1997 | Fujita et al. |
| 6,168,118 B1 | 1/2001 | Vancraeynest et al. |
| 2010/0005774 A1 | 1/2010 | Fukuda |
| 2013/0104775 A1* | 5/2013 | Binhussain ............ C04B 28/02 106/638 |
| 2014/0357761 A1 | 12/2014 | Williamson |

FOREIGN PATENT DOCUMENTS

| CN | 101274831 A | * 10/2008 |
| CN | 104177029 A | * 12/2014 |
| IN | 215872 | 5/2008 |
| RU | 2007135156 A | * 3/2009 |

OTHER PUBLICATIONS https://www.linkedin.com/pub/helix-steel/84/833/271, Internet webpage for Helix Steel LinkedIn® profile, Micro-Rebar at Helix Steel, Ann Arbor, Michigan—Construction, Jul. 2015.

\* cited by examiner

*Primary Examiner* — Anthony J Green
(74) *Attorney, Agent, or Firm* — Dunlap Bennett & Ludwig PLLC

(57) ABSTRACT

An improved method of reinforcing concrete is provided. A plurality of carbon fiber tubules may be added to the cementitious slurry so as to increase the cured concrete's tensile strength and resistance to corrosion.

3 Claims, 6 Drawing Sheets

CONCRETE REINFORCEMENT SYSTEM

BACKGROUND OF THE INVENTION

The present invention relates to concrete reinforcement and, more particularly, to an improved process of reinforcing concrete by using carbon fiber tubules so as to increase the cured concrete's tensile strength and resistance to corrosion.

It has long been known to insert metal into fabrications of cementitious materials. Basic steel reinforced concrete has been used for over a century. It is outdated and is the major cause of present day infrastructure failure. Basic steel reinforced concrete can manage pressure from around 10 MPa, 1450 psi, to 40 MPa, 5800 psi. Steel fiber reinforced concrete is a new micro reinforcement addition to the process of reinforcing concrete, and has a pressure range between 750 MPa, 108,778 psi, and 2850 MPa, 413,357 psi. Carbon fiber is roughly 10 times stronger than steel.

However, corrosion of steel reinforcements in concrete is a common form of deterioration in cold climates and seaside environments. The process of carbonization in the curing of concrete lowers the pH of the cement pore solution so as to become more acidic, causing the reinforcement steel rebar or steel fibers to corrode. Once the steel reinforcement is compromised the concrete is useless.

As can be seen, there is a need for an improved method of reinforcing concrete by using carbon fiber tubules so as to increase the cured concrete's tensile strength and resistance to corrosion.

SUMMARY OF THE INVENTION

In one aspect of the present invention, a process of producing reinforced concrete includes the steps of forming a slurry by mixing a cementitious material and water at a water-to-cementitious material ratio of approximately 0.30 to 0.45 by mass; and mixing a plurality of carbon fiber tubules to the slurry, forming a cementitious admixture, among other various aggregates and strengthening agents as needed.

In another aspect of the present invention, a reinforced concrete admixture includes a slurry that has a cementitious material and water at a water-to-cementitious material ratio of approximately 0.30 to 0.45 by mass; and a plurality of carbon fiber tubules mixed into the slurry, among other various aggregates and strengthening agents as needed.

In yet another aspect of the present invention, a reinforced concrete admixture includes a slurry that has a cementitious material and water at a water-to-cementitious material ratio of approximately 0.30 to 0.45 by mass; and a plurality of carbon fiber tubules mixed into the slurry, wherein each carbon fiber tubule forms a plurality of either separately, or in a combination of: corrugated, helical, circular, elliptical, or cylindrical shapes.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improved method of reinforcing concrete by embedding a plurality of carbon fiber tubules in the cementitious slurry so as to increase the cured concrete's tensile strength and resistance to corrosion.

Figure 1:
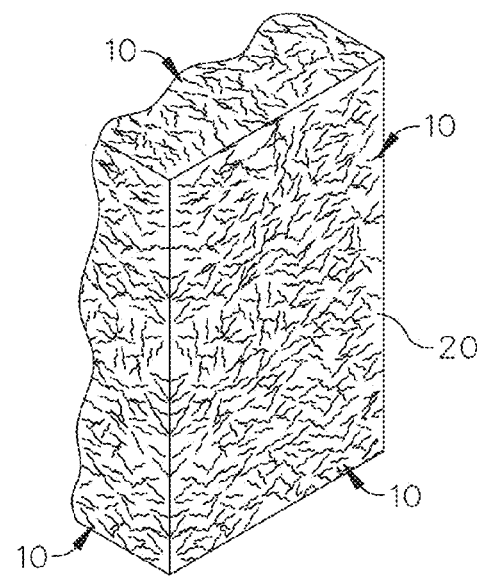
FIG. 1 is a perspective view of an exemplary embodiment of the present invention, shown in use.
Figure 2:
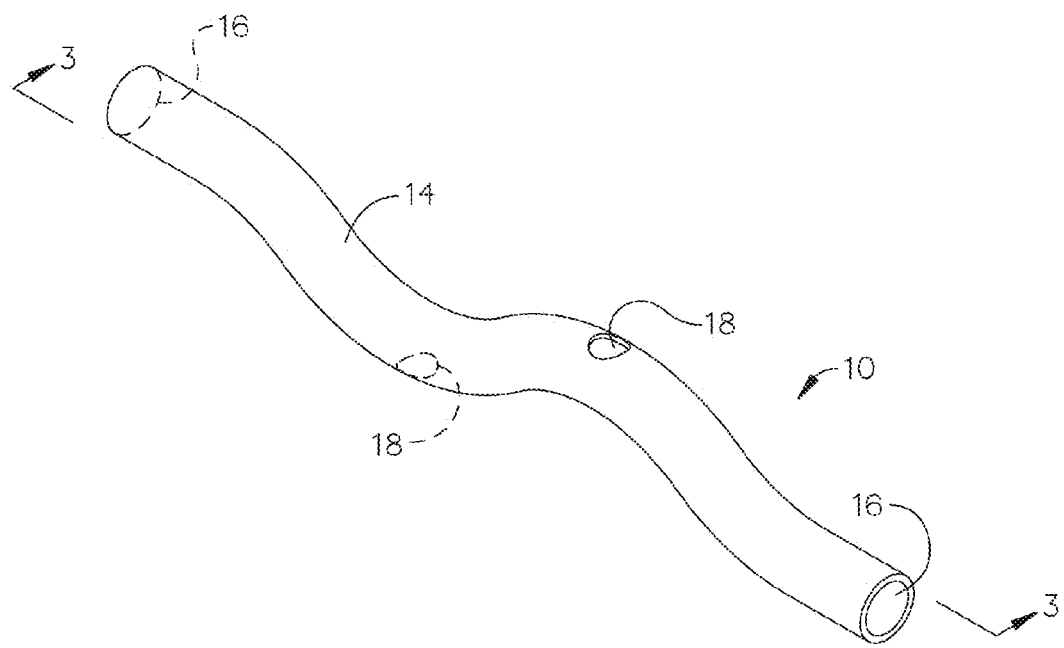
FIG. 2 is a perspective view of an exemplary embodiment of the present invention.
Figure 3:
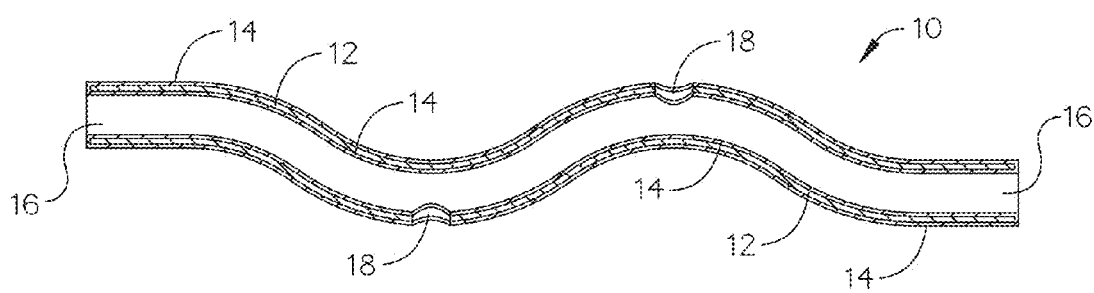
FIG. 3 is a section view of an exemplary embodiment of the present invention, taken along line 3-3 of FIG. 2.
Figure 4:
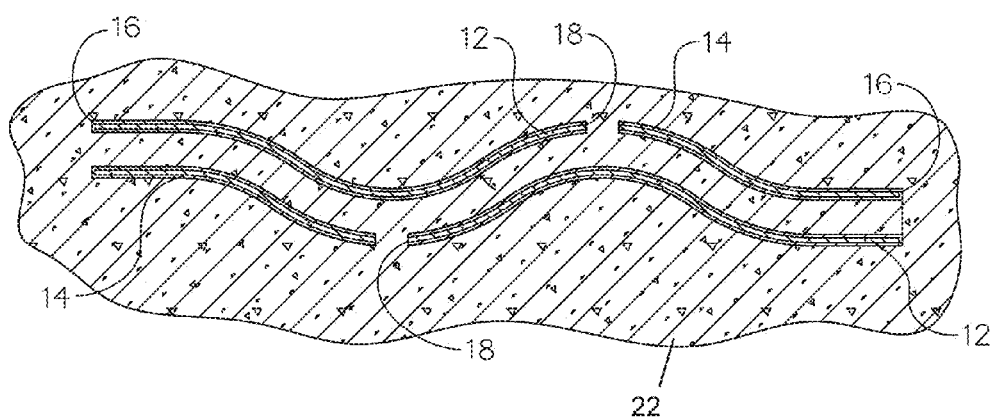
FIG. 4 is a section view of an exemplary embodiment of the present invention, shown in use.
Figure 5:
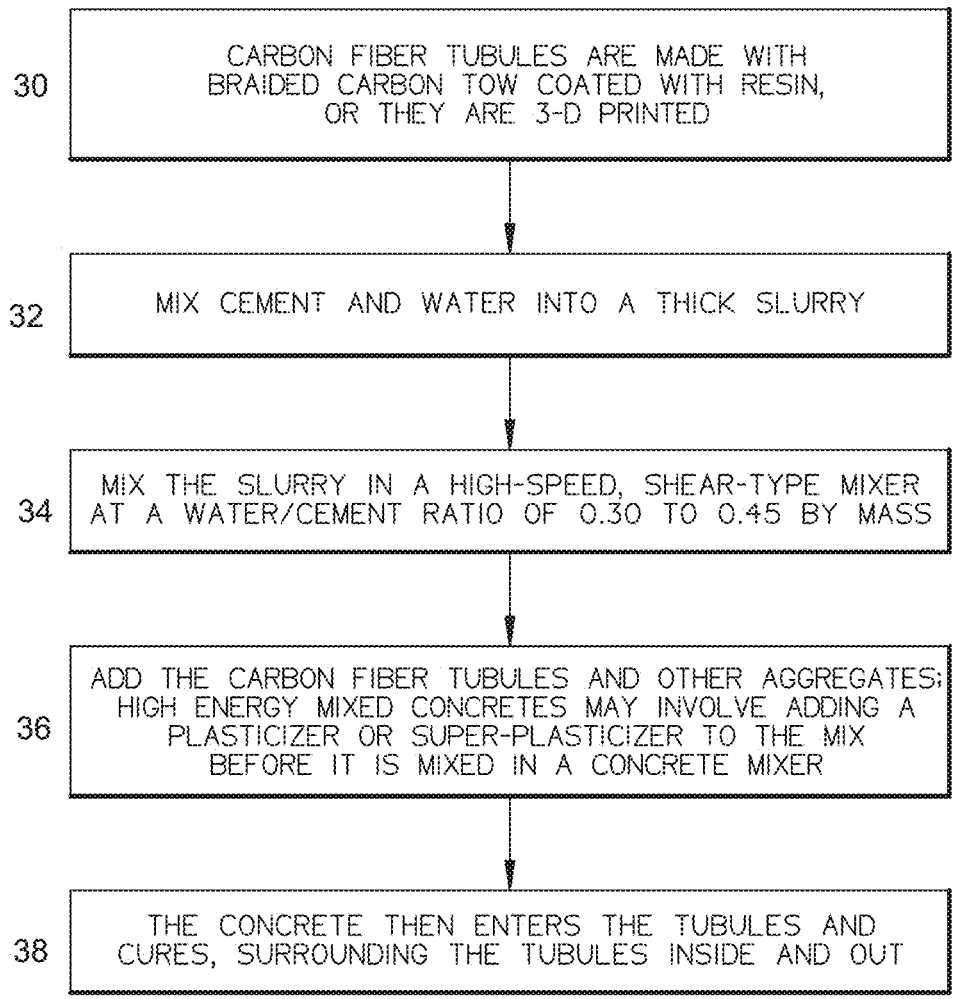
FIG. 5 is a flow chart of an exemplary embodiment of the present invention.

Referring to FIGS. 1 through 5, the present invention may include an improved method of reinforcing concrete 20 using carbon fiber tubules 10. The carbon fiber tubules 10 may be fiber tow 12 having a resin coat 14 applied thereto. In certain embodiments the resin coat 14 may be a thin graphene coating. Carbon fiber is roughly ten times stronger than steel, thereby increasing the tensile strength of the cement it reinforces. Moreover, carbon fiber is not subject to the corrosive processes of carbonization, and so the curing of carbon fiber-reinforced concrete may not weaken the concrete.

Figure 6:
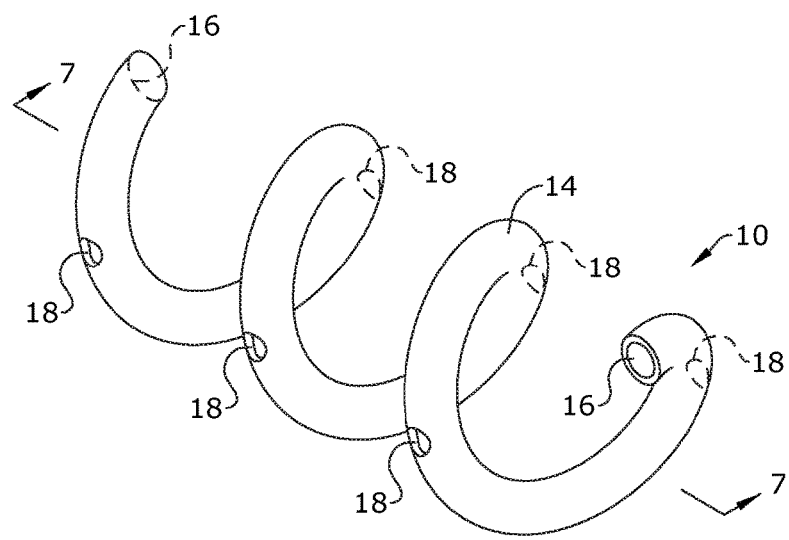
FIG. 6 is a perspective view of an alternative embodiment of the present invention.
Figure 7:
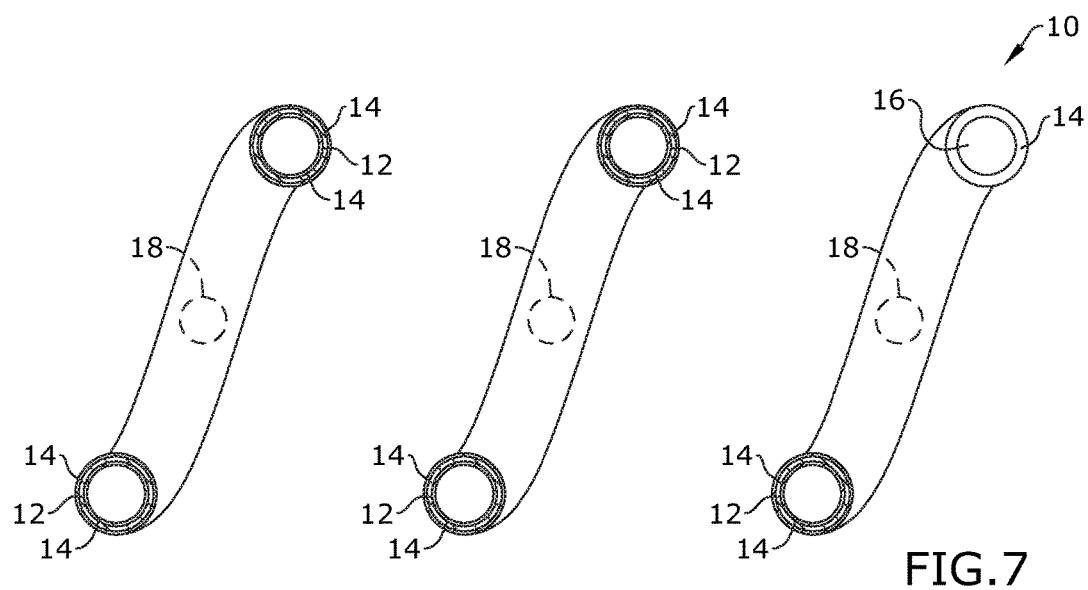
FIG. 7 is a section view of an alternative embodiment of the present invention, taken along the line 7-7 in FIG. 6.
Figure 8:
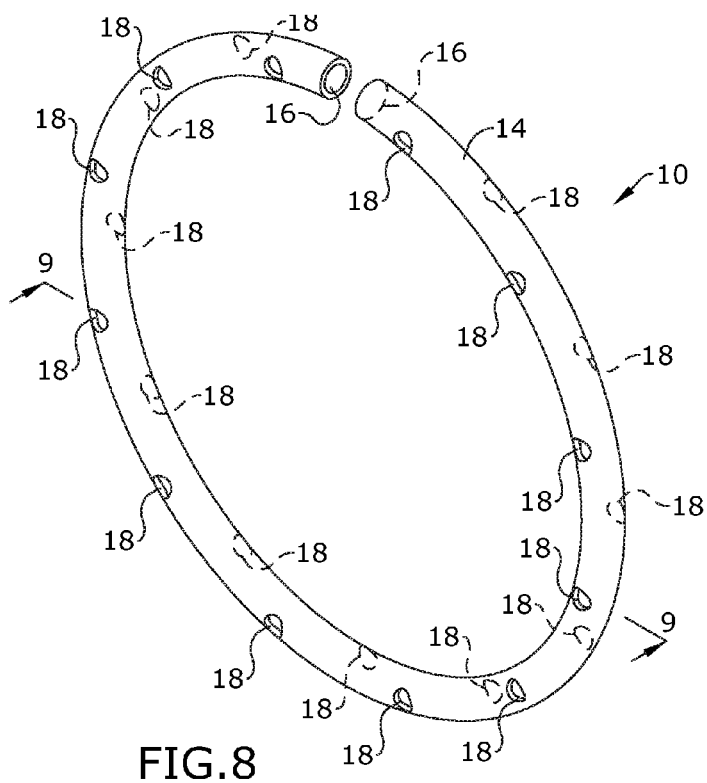
FIG. 8 is a perspective view of an alternative embodiment of the present invention.
Figure 9:
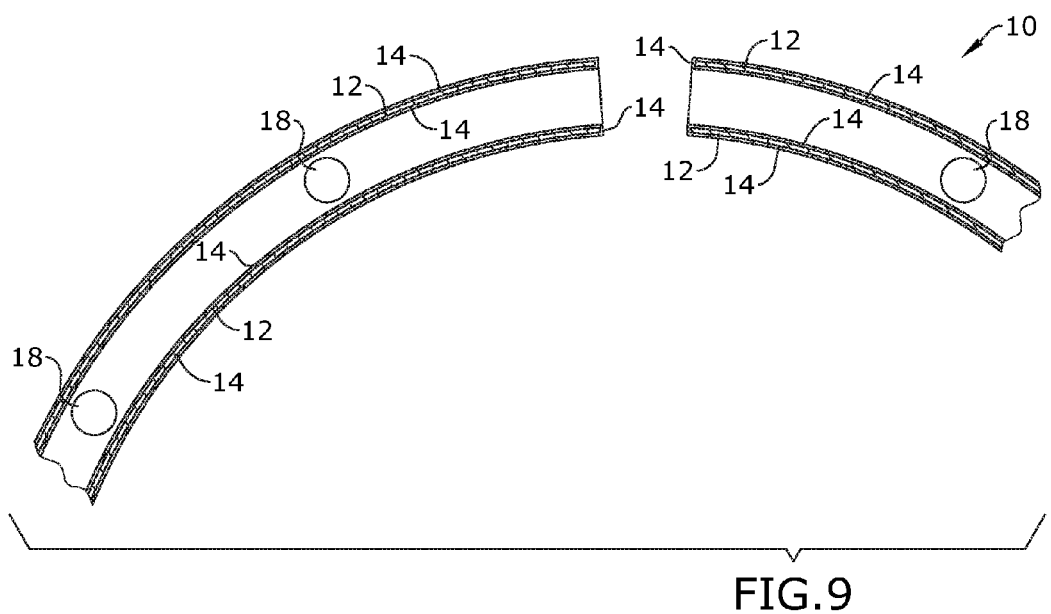
FIG. 9 is a section view of an alternative embodiment of the present invention, taken along the line 9-9 in FIG. 8.
Figure 10:
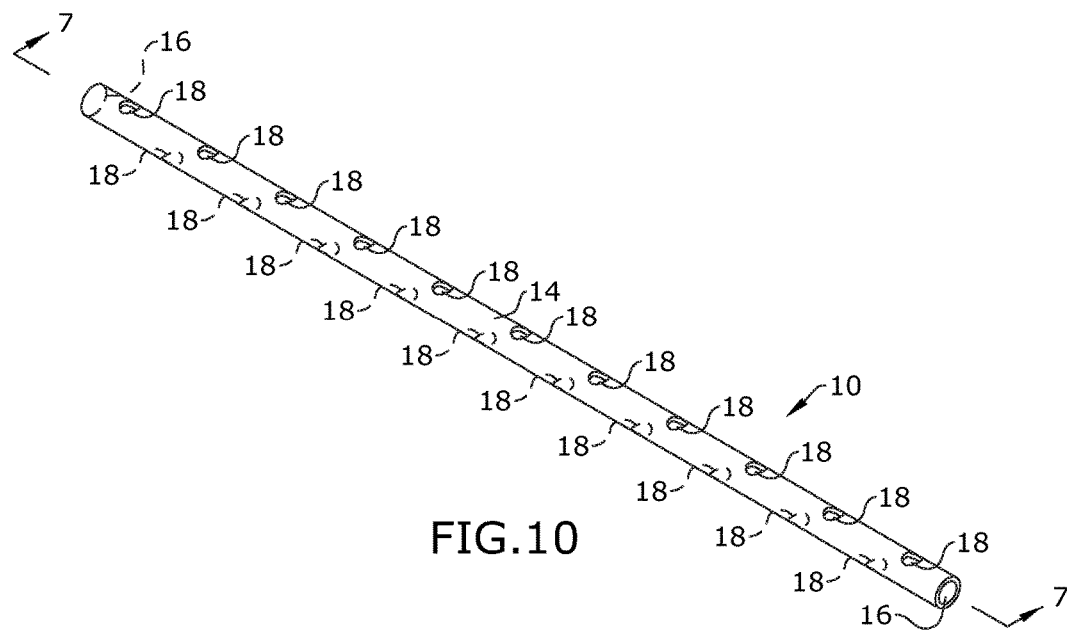
FIG. 10 is a perspective view of an alternative embodiment of the present invention.
Figure 11:
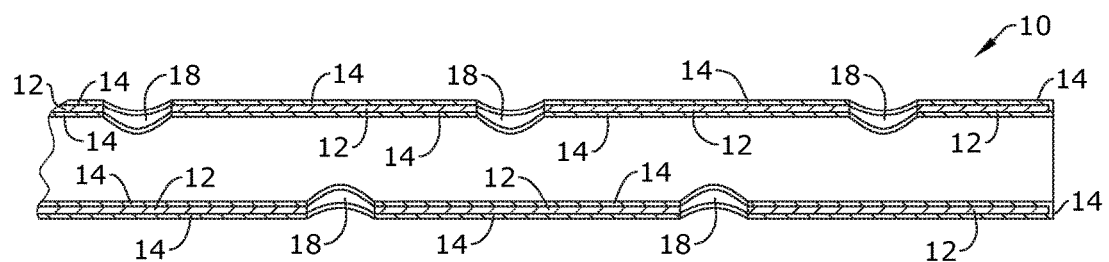
FIG. 11 is a section view of an alternative embodiment of the present invention, taken along the line 11-11 in FIG. 10.

A process of making the carbon fiber tubules 10 may include utilizing additive manufacturing, such as 3D printing, to form the carbon fiber tubules 10. Alternatively, the carbon fiber tubules 10 may be formed from a carbon fiber tow that is woven or braided on a loom, and then resin coated. The carbon fiber tubules 10 can be substantially corrugated, cylindrical, helical, circular, elliptical or other geometric shapes or non-geometrical shapes including wave-shaped, as illustrated in FIGS. 6 through 11, so long as the carbon fiber tubules 10 function in accordance with the present invention as described herein. A thin coating of graphene can be added in the 3D printing process to the exterior and interior of the carbon fiber tubules in manufacturing in order to further strengthen the tubules.

The carbon fiber tubules 10 may have a tubular shape, forming a lumen extending to fluidly connect opposing ends 16, so that the concrete 20 may enter the lumen of the carbon fiber tubules 10 and cure therein as well as surrounding each carbon fiber tubules 10. The carbon fiber tubules 10 may form a plurality of openings 18, allowing concrete in, and providing each such carbon fiber tubules 10 with gripping strength, whereby such carbon fiber tubule 10 may not be stripped from the concrete 20 under extreme force, and to allow air out of the tubules in the mixing process.

An improved method of reinforcing concrete may include the following. The plurality of carbon fiber tubules 10 disclosed above may be provided, in step 30. In step 32, a user may mix cement and water into a suitably thick slurry. Then the user may mix the slurry in a high-speed, shear-type mixer at a water/cement ratio of approximately 0.30 to 0.45 by mass, in step 34. Next, in step 36, the user may add the plurality of carbon fiber tubules 10 and other aggregates, forming a cementitious admixture 22. High energy mixed concretes may involve adding a plasticizer or superplasticizer to the cementitious admixture 22 before it is mixed in a concrete mixer. In step 38, the slurry enters the ends 16 and the plurality of openings 18 of plurality of carbon fiber tubules 10; a concrete structural element is formed by pouring a first layer of the cementitious admixture 22, curing into the high-tensile strength, corrosive-resistant reinforced concrete 20.

The present invention may be used to strengthen military bunkers, highways, bridges, high rise structures for structural reasons, and may benefit those structures in hurricane, tornado, flood, tidal wave, or earthquake prone regions. In certain embodiments, the present invention may be used to create multiple prefabricated construction materials such as sea walls, bridge parts such as trusses, beams, abutments, piers and supports, highway dividers and barriers, building slabs and supports, prefabricated walls and roofing materials, military bunkers, barriers and bulkheads.

The carbon fiber tubules 10 can be used in cast materials such as fiber-glass, plastics, and among other host materials to strengthen airplane parts, car parts, in ship building, and rocket building and spaceship parts, and Mars, and Lunar constructions in the future, because of its high heat tolerance and high strength.

It should be understood, of course, that the foregoing relates to exemplary embodiments of the invention and that modifications may be made without departing from the spirit and scope of the invention as set forth in the following claims.

What is claimed is:

1. A process of producing reinforced concrete, comprising the steps of:
    forming a slurry by mixing a cementitious material and water at a water-to-cementitious material ratio of approximately 0.30 to 0.45 by mass; and
    mixing a plurality of carbon fiber tubules to the slurry, forming a cementitious admixture, wherein each carbon fiber tubule of the plurality of carbon fiber tubules provides a plurality of holes between its opposing ends and is either helical or circular shape.

2. The process of claim 1, further comprising the steps of adding a plasticizer or superplasticizer to the cementitious admixture.

3. A reinforced concrete admixture, comprising:
    a slurry comprising a cementitious material and water at a water-to-cementitious material ratio of approximately 0.30 to 0.45 by mass; and
    a plurality of carbon fiber tubules mixed into the slurry, wherein each carbon fiber tubule of the plurality of carbon fiber tubules provides a plurality of holes between its opposing ends and is either helical or circular shape.

* * * * *